US007787381B2

(12) United States Patent
Small et al.

(10) Patent No.: US 7,787,381 B2
(45) Date of Patent: Aug. 31, 2010

(54) METHODS AND APPARATUS TO MANAGE NETWORK TRANSPORT PATHS IN ACCORDANCE WITH NETWORK POLICIES

(75) Inventors: David Small, Dublin, CA (US); Michael T. Raftelis, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 385 days.

(21) Appl. No.: 11/610,265

(22) Filed: Dec. 13, 2006

(65) Prior Publication Data

US 2008/0144513 A1    Jun. 19, 2008

(51) Int. Cl.
H04L 1/00    (2006.01)
(52) U.S. Cl. .................. 370/237; 370/238; 370/252; 370/395.21; 370/395.43; 370/400; 709/238
(58) Field of Classification Search ................ 370/229, 370/235, 238, 241, 252, 351, 389, 395.1, 370/395.2, 395.21, 395.4, 395.42; 726/1, 726/2, 3, 4, 5, 6, 7, 16, 17, 18, 19, 21; 709/227, 709/228, 229, 230, 232, 235, 238, 239, 240
See application file for complete search history.

(56) References Cited

U.S. PATENT DOCUMENTS

| 6,466,984 | B1 * | 10/2002 | Naveh et al. ............... 709/228 |
| 6,690,649 | B1 | 2/2004 | Shimada |
| 6,690,651 | B1 | 2/2004 | Lamarque, III et al. |
| 6,751,729 | B1 * | 6/2004 | Giniger et al. .............. 713/153 |
| 6,973,042 | B1 | 12/2005 | Fitzgerald |
| 7,062,642 | B1 | 6/2006 | Langrind et al. |
| 7,082,102 | B1 | 7/2006 | Wright |
| 7,272,625 | B1 * | 9/2007 | Hannel et al. ............... 709/200 |
| 2002/0109879 | A1 * | 8/2002 | Wing So ..................... 359/118 |
| 2002/0181395 | A1 | 12/2002 | Foster et al. |
| 2002/0194317 | A1 | 12/2002 | Kanada et al. |
| 2003/0074443 | A1 | 4/2003 | Melaku et al. |
| 2004/0203820 | A1 | 10/2004 | Billhartz |
| 2004/0264372 | A1 | 12/2004 | Huang |
| 2005/0080914 | A1 * | 4/2005 | Lerner et al. ............... 709/230 |
| 2005/0102414 | A1 | 5/2005 | Hares et al. |
| 2005/0125688 | A1 * | 6/2005 | Ogawa et al. ............... 713/200 |
| 2005/0198097 | A1 | 9/2005 | Kalnitsky |
| 2006/0088063 | A1 | 4/2006 | Hartung et al. |
| 2006/0182033 | A1 * | 8/2006 | Chen et al. .................. 370/237 |

(Continued)

OTHER PUBLICATIONS

Written Opinion and International Search Report mailed on Apr. 24, 2008, in corresponding PCT Application No. PCT/US07/085515, 12 pages.

(Continued)

Primary Examiner—Seema S. Rao
Assistant Examiner—Khoa Huynh
(74) Attorney, Agent, or Firm—Hanley, Flight, & Zimmerman, LLC

(57) ABSTRACT

Methods and apparatus to manage network transport paths in accordance with network policies are disclosed. An example apparatus comprises a policy manager to manage a first policy for a first endpoint and a second policy for a second endpoint, and a path manager to provision a transport network path based on the first and second policies.

16 Claims, 6 Drawing Sheets

U.S. PATENT DOCUMENTS

2007/0263592 A1* 11/2007 Agarwal et al. ............. 370/351
2009/0125631 A1* 5/2009 Blom et al. ................. 709/228

OTHER PUBLICATIONS

U.S. Appl. No. 11/427,135, filed Jun. 28, 2006, entitled "Method and Apparatus for Improving Network Performance in a Communication System", 21 pages.

U.S. Appl. No. 11/427,142, filed Jun. 28, 2006, entitled "Method and Apparatus for Maintaining Network Performance in a Communication System", 24 pages.

Cisco Resource Policy Management System, 1992-2001, Cisco Systems, 6 pages.

The International Bureau, "International Preliminary Report on Patentability," issued in connection with counterpart international application No. PCT/US2007/085515, mailed Jun. 25, 2009, 2 pages.

The International Searching Authority, "Written Opinion of the International Searching Authority," issued in connection with counterpart international application No. PCT/US2007/085515, mailed Jun. 25, 2009, 6 pages.

* cited by examiner

METHODS AND APPARATUS TO MANAGE NETWORK TRANSPORT PATHS IN ACCORDANCE WITH NETWORK POLICIES

FIELD OF THE DISCLOSURE

This disclosure relates generally to transport networks and, more particularly, to methods and apparatus to manage network transport paths in accordance with network policies.

BACKGROUND

In a communication network, such as a transport network, paths through the communication network are selected, defined, configured and/or provisioned to establish connectivity between, for example, a user and/or wireless base station and a service providing server and/or service providing network. Such a transport network may be used, for example, to back-haul data from wireless base stations to a mobile telephone switching office (MTSO) and/or to distribute services (e.g., audio, video and/or gaming) to end users. Today, the selection, definition, configuration and/or provisioning of transport network paths is performed by elements of the transport network that may have limited overall visibility of the network, and/or is performed based upon one or more Quality of Service (QoS) parameters, such as bit-error rate, unavailable seconds, latency, jitter and/or data loss. In such circumstances, when one or more QoS objectives are no longer satisfied (e.g., a bit-error rate exceeds a threshold), one or more paths of the transport network may be re-selected, re-defined, re-configured and/or re-provisioned in an attempt to meet the QoS objective(s).

DETAILED DESCRIPTION

Methods and apparatus to manage network transport paths in accordance with network policies are disclosed. A disclosed example apparatus includes a policy manager to manage a first policy for a first endpoint and a second policy for a second endpoint, and a path manager to provision a transport network path based on the first and second policies. A disclosed example method includes selecting a first path through a transport network for a first endpoint based upon a first policy associated with the first endpoint and a second policy associated with a second endpoint, and provisioning one or more elements of the transport network to implement the first path.

Figure 1:
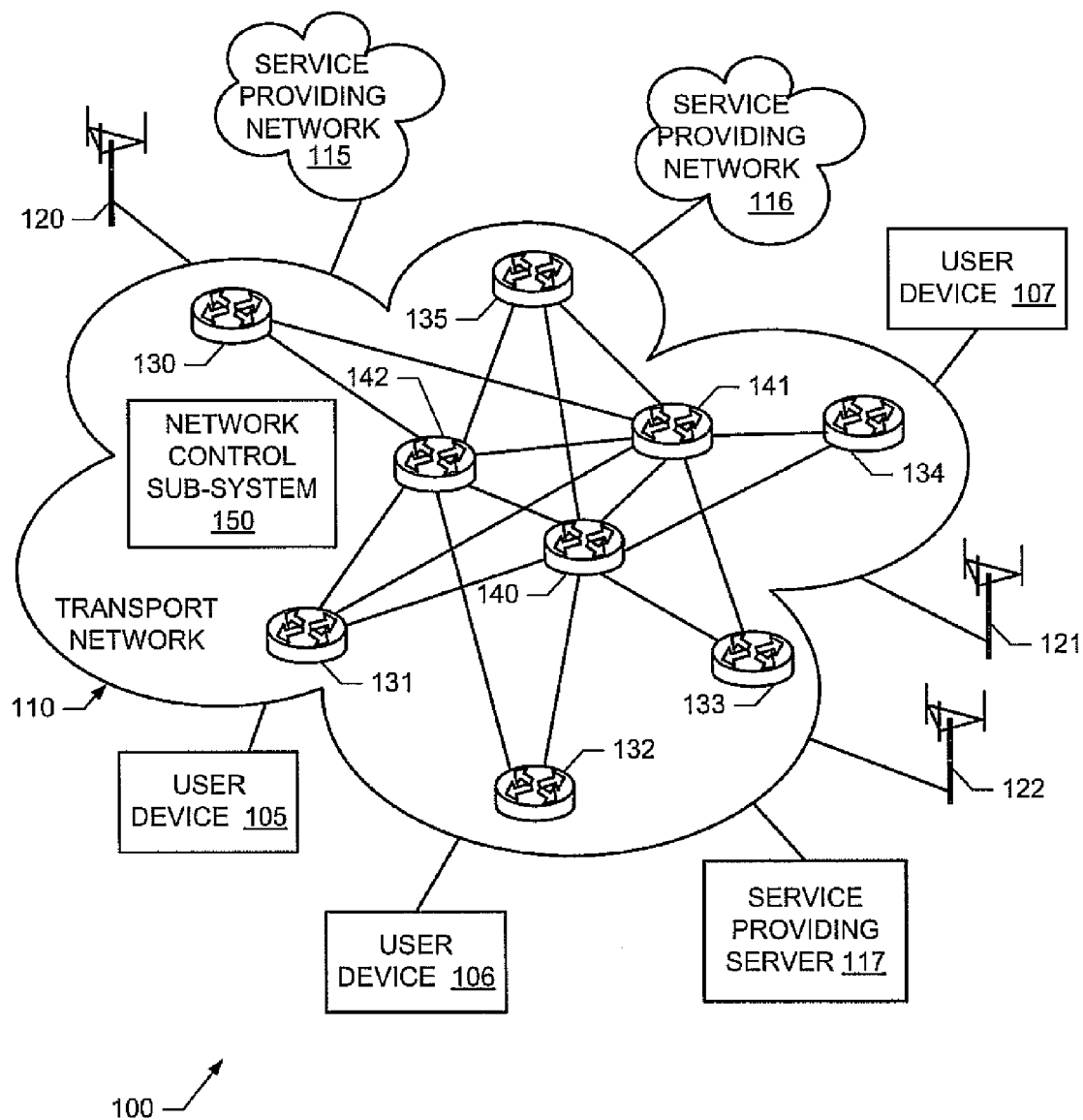
FIG. 1 is a schematic illustration of an example communication system constructed in accordance with the teachings of the invention.

FIG. 1 is a schematic illustration of an example communication system 100 constructed in accordance with the teachings of the invention. In the interest of brevity and clarity, throughout the following descriptions references will be made to methods and apparatus to select, define, configure and/or provision transport network paths for the example communication system 100 of FIG. 1. However, it should be understood that the methods and apparatus described herein are applicable to other examples and/or types of communication systems, and/or other examples and/or types of communication services, networks, technologies and/or systems, such as public switched telephone network (PSTN) systems, public land mobile network (PLMN) systems, wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or combinations and/or hybrids of these devices, systems and/or networks. As used herein, the term "transport network" refers to any heterogeneous and/or homogenous combination of similar and/or dissimilar networks and/or network architectures, such as Institute of Electrical and Electronics Engineers (IEEE) 802.16x (a.k.a. WiMAX) networks, multi-protocol label switching (MPLS) Internet Protocol (IP) networks, circuit switched networks, packet switched networks, broadcast networks, wired networks, wireless networks, cellular networks, distribution networks, and/or optical networks.

To allow user devices (three of which are illustrated in FIG. 1 with reference numerals 105, 106 and 107) and/or users of user devices 105-107 to access communication services (e.g., telephone services, Internet services, data services, messaging services, instant messaging services, electronic mail (email) services, chat services, video services, audio services, television services, cellular services, gaming services, etc), the example communication system 100 of FIG. 1 includes any number and/or type(s) of transport networks (one of which is illustrated in FIG. 1 with reference numeral 110). The example user devices 105-107 of FIG. 1 may be any type(s) of fixed-location, substantially fixed-location and/or mobile communication devices including, for example, a voice over Internet protocol (VoIP) device, a residential gateway, a personal computer (PC), a personal digital assistant (PDA), a smart phone, a cellular and/or wireless device, and/or a set-top box.

In the illustrated example system 100 of FIG. 1, the example user devices 105-107 are communicatively coupled to the example transport network 110 via any number and/or type(s) of past, current and/or future communication network(s), communication system(s), communication device(s), transmission path(s), protocol(s), technique(s), specification(s) and/or standard(s). For instance, the example user devices 105-107 may be coupled to the transport network 110 via any type(s) of voice-band modem(s), digital subscriber line (DSL) modem(s), cable modem(s), Ethernet transceiver(s), optical transceiver(s), IP virtual private network (VPN) connection(s), IEEE 802.11x (a.k.a. WiFi) transceiver(s), IEEE 802.16 (a.k.a. WiMax), wireless local area network (WLAN) access point(s), cellular transmission(s), etc. Moreover, the example transport network 110 of FIG. 1 may extend geographically to include a location near to and/or encompassing any user device 105-107. For example, the transport network 110 may include a wireless access point (not shown) by which, for example, a WiFi IP phone connects to the transport network 110.

To provide communication services, the example communication system 100 of FIG. 1 includes one or more communication service servers and/or service provider networks and/or systems, three of which are illustrated in FIG. 1 with reference numerals 115, 116 and 117. The example communication service providing servers and/or networks 115-116 of FIG. 1 include any number and/or type(s) of servers and/or devices communicatively coupled using any topology to provide any type of communication service. Example communication service servers and/or networks 115-116 include, but are not limited to, networks and/or systems to provide VoIP services, networks and/or systems to provide Internet services (e.g., Internet access, gaming, Internet protocol (IP) television (IPTV), messaging, email, etc.), networks and/or systems to provide television, video and/or audio services, and/or a mobile telephone switching office (MTSO).

As illustrated in the example system 100 of FIG. 1, the example transport network 110 may, alternatively or additionally, be used to transport data between the example communication service servers and/or networks 115-116, and/or between any number and/or type(s) of additional and/or alternative devices, servers and/or systems and the communication service servers and/or networks 115-116. For example, the transport network 110 may be configured and/or provisioned to backhaul communication data between wireless base stations (three of which are shown in FIG. 1 with reference numerals 120, 121 and 122) and the example communication service servers and/or networks 115-116.

The example transport network 110 of FIG. 1 is any type of packet switched network operated in accordance with any number of past, present and/or future specifications and/or standards, such as in accordance with any of the Internet Engineering Task Force (IETF) request for comment (RFC) specifications concerning MPLS (e.g., IETF RFC 3031 (MPLS Architecture), IETF RFC 4201 (Link Bundling in MPLS Traffic Engineering, etc.)

To transport data between any or all of the example user devices 105-106, the example communication service servers and/or networks 115-116 and/or the example wireless base stations 120-122, the example transport network 110 of FIG. 1 includes any number and/or type(s) of network and/or communication devices 130-135 and 140-142. Example network and/or communication devices 130-135, 140-142 include any type(s) of edge routers 130-135 and any type(s) of core routers 140-142. In the illustrated example transport network 110 of FIG. 1, the routers 130-135, 140-142 are communicatively coupled via any type(s) of communication links that enable the transport network 110 to be configured and/or provisioned to transport data between any or all of the example user devices 105-106, the example communication service servers and/or networks 115-116 and/or the example wireless base stations 120-122.

The example routers 130-135, 140-142 of the example transport network 110 of FIG. 1 are arranged and/or communicatively coupled to create any type of transport network topology, such as a mesh topology, a ring topology, a star topology, and/or any combination(s) of such topologies. In the example of FIG. 1, the user devices 105-106, the communication service servers and/or networks 115-116 and/or the wireless base stations 120-122 are each communicatively coupled to an edge router 130-135 based upon, for example, the location at which the user device 105-106, the communication service server and/or network 115-116 and/or the wireless base station 120-122 is coupled to the transport network 110. The example core routers 140-142 of FIG. 1 are configured and/or provisioned to transport data between the edge routers 130-135 and, therefore, between the user devices 105-106, the communication service servers and/or networks 115-116 and/or the wireless base stations 120-122. Any number and/or type(s) of core routers 140-142 may be used, configured and/or provisioned to transport data between a particular pair of edge routers 140-142. Additionally, the example transport network 110 of FIG. 1 may be arranged using a hierarchical switching architecture and/or a multi-tiered architecture, and/or to include additional edge and/or core routers 130-135, 140-142 for purposes of, for example, fault recovery and/or redundancy.

In the example transport network 110 of FIG. 1, paths between the user devices 105-106, the communication service servers and/or networks 115-116 and/or the wireless base stations 120-122 are selected and/or defined as label switched paths. The example routers 130-135, 140-142 of FIG. 1 are provisioned and/or configured to transport data based upon label switched paths. Label switch paths may be selected, defined and/or utilized in transporting data based upon, for example, any of the IETF RFCs concerning MPLS.

To define, select, configure and/or provision label switched paths for the communication system 100, the example transport network 100 of FIG. 1 includes a network control sub-system 150. The example network control sub-system 150 of FIG. 1 controls and/of configures access by the user devices 105-107 to the transport network 110, and/or access by the user devices 105-107 to the service servers and/or network 115-117 based upon one or more policies. Example policies define how a user device 105-107 is authenticated, what service(s) it has access to, what hours of service are authorized, guaranteed data rate, quality-of-service (QoS) parameters, and/or an allowed amount of data per period of time. However, policies may include any number and/or type(s) of alternative and/or additional parameters. Moreover, policies may be defined on a per user, a per user device basis, and/or be defined for a set and/or type of user and/or user device. For example, a set of residential subscribers to an Internet Protocol (IP) television (IPTV) service may share a common policy and/or set of policy parameters.

The example network control sub-system 150 of FIG. 1 defines, selects, configures and/or provisions the label switched paths based upon the policies and/or based upon one or more additional parameters. Additional parameters that may be used while defining, selecting, configuring and/or provisioning label switched paths include, but are not limited to, a time-of-day, a day-of-week, a day-of-year, a usage limit per period, a localization priority (e.g., prioritization of communication traffic within the transport network 110 corresponding to a heavily traveled commuter route during rush hour), a maintenance event, or a network fault. An example manner of implementing the example network control sub-system 150 is described below in connection with FIG. 2.

While in the example communication system 100 of FIG. 1, the transport network 110 is illustrated separately from the service providing servers and/or networks 115-117 and/or the wireless base stations 120-122, the transport network 110 may include any/or all of such servers, networks and/or devices. Moreover, an entity owning and/or operating any or all of the example transport network 110 may own, lease and/or operate any or all of the user devices 105-107, the service providing servers and/or networks 115-117 and/or the wireless base stations 120-122. For example, a service provider may operate both the transport network 110 and one or more service providing servers and/or networks 115-117 to provide access to communication services and to provide the actual communication services. In other examples, a service provider may provide the user devices 105-107 to users subscribing to particular service, such as IP TV.

While an example communication system 100 has been illustrated in FIG. 1, the devices, networks, systems, servers and/or processors illustrated in FIG. 1 may be combined, divided, re-arranged, eliminated and/or implemented in any of a variety of ways. Further, any or all of the example user devices 105-107, the example service providing servers and/or networks 115-117, the example wireless base stations 120-122, the example routers 130-135, 140-142, the example network control sub-system 150 and/or, more generally, the example transport network 110 of FIG. 1 may be implemented by hardware, software, firmware and/or any combination of hardware, software and/or firmware. Moreover, the example communication system 100 may include additional servers, systems, networks, gateways, portals, and/or processors than those illustrated in FIG. 1 and/or may include more than one of any or all of the illustrated devices, servers, networks, systems, gateways, portals, and/or processors.

Figure 2:
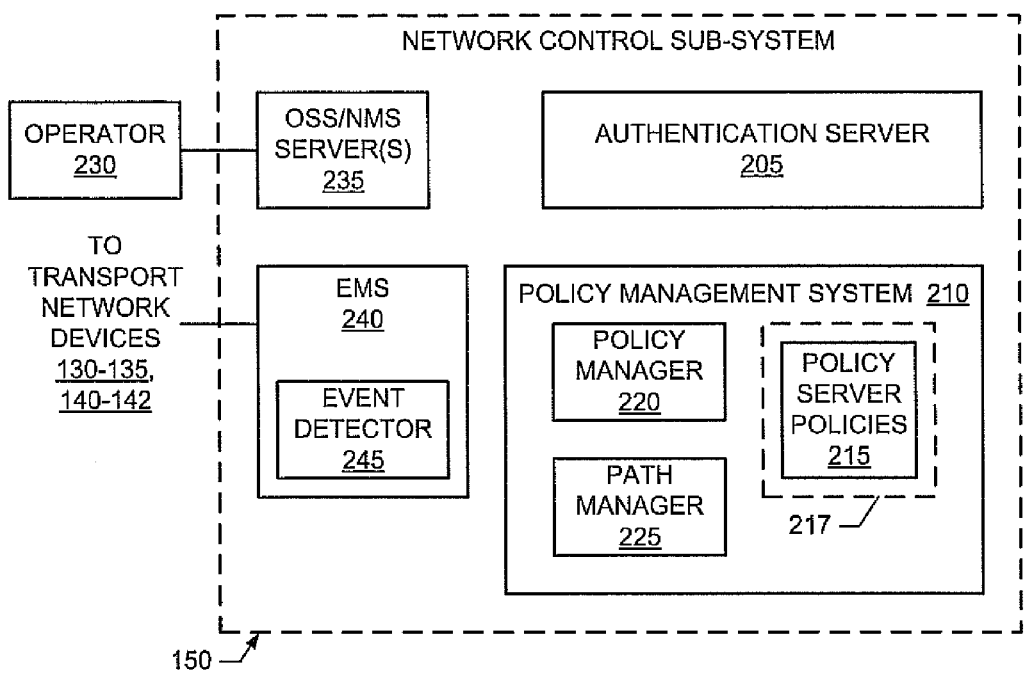
FIG. 2 illustrates an example manner of implementing the example network control sub-system of FIG. 1.

FIG. 2 illustrates an example manner of implementing the example network control sub-system 150 of FIG. 1. To authenticate users and/or user devices 105-107 and/or to control access of user devices 105-107 to the example transport network 110, the example network control sub-system 150 of FIG. 2 includes any number and/or type(s) of authentication servers, one of which is illustrated in FIG. 2 with reference number 205. Using any method(s), algorithm(s), logic and/or protocol(s), the example authentication server 205 authenticates users and/or user devices 105-107 when the users and/or user devices 105-107 attempts to gain access to a communication service and/or the example transport network 110 by requesting, obtaining and verifying one or more user and/or user device credentials, such as an account name and/or password. An example authentication server 205 is any type of device and/or server implemented in accordance with the IEEE 802.1X standard and/or implementing a remote authentication dial-in user service (RADIUS) protocol.

To select, define, configure and/or provision label switched paths for users and/or user devices 105-107, the example network control sub-system 150 of FIG. 2 includes a policy management system 210. When a user and/or user device 105-107 is authenticated, the example authentication server 205 of FIG. 2 provides an indication of the authentication to the policy management system 210. The authentication server 205 may also interact with the policy management system 210 during an authentication process to obtain policy information related to a user and/or user device 105-107.

The example policy management system 210 of FIG. 2, when it receives an authentication indication, determines one or more policy server policies 215 that apply to the user and/or user device 105-107 and then selects, defines, configures and/or provisions one or more label switch paths between the user and/or user device 105-107 and one or more service providing servers and/or networks 115-117. Additionally or alternatively, the example policy management system 210 may identify that communication service data for the authenticated user and/or user device 105-107 is to be transported via one or more existing label switched paths. For example, an existing label switched path may already exists that connects a pedestal in a residential neighborhood to an IP TV server 115-117 such that all authenticated IP TV subscribers in the neighborhood utilize the same label switch path.

The example policy management system 210 of FIG. 2 selects, defines, configures and/or provisions label switched paths of the transport network 110 based on a set of policy server policies 215 in effect for one or more currently authenticated user and/or user devices 105-107. That is, the policy management system 210 selects, defines, configures and/or provisions label switched paths across a set of users and/or user devices 105-107 based upon their policy server policies 215. The example policy server policies 215 of FIG. 2 may be implemented using any data structure(s) and may be stored in any number and/or type(s) of data storage device(s) and/or memory(-ies) 217.

To identify and/or apply policy server policies 215, the example policy management system 210 of FIG. 2 includes any number and/or type(s) of policy managers 220. Using any method(s), algorithm(s), logic and/or protocol(s), the example policy manager 220 of FIG. 2 selects one or more policy server policies 215 that apply to an authenticated user and/or user device 105-107 and then directs a path manager 225 to select, define, configure and/or provision label switch paths for the authenticated user and/or user device 105-107. An example policy manager 220 is the Resource Policy Management System (RPMS) from Cisco Systems, Inc. and/or similar systems provided by, for example, Alcatel and/or Riverstone Networks.

To select, define, configure and/or provision label switched paths, the example policy management system 210 includes the path manager 225. The example path manager 225 of FIG. 2 defines, configures and/or provisions the label switched paths based upon the policy server policies 215 being applied to one or more currently authenticated user and/or user devices 105-107. An example manner of implementing the example path manager 225 is described below in connection with FIG. 3.

To allow, for example, an operator and/or technician 230, to control and/or configure the network control sub-system 150 of FIG. 2, the network control sub-system 150 includes any operations support system (OSS) and/or network management system (NMS) server(s) 235. The example OSS/NMS servers 235 of FIG. 2 provides one or more interfaces (e.g., a web based interface) that allows the operator and/or technician 230 to configure the authentication server 205, the policy management system 210 and/or the policy server policies 215. For example, the operator and/or technician 230 can configure one or more credentials used by the authentication server 205 to authenticate a user and/or user device 105-107 and/or to configure one or more policy server policies 215 to be applied to a particular user and/or user device 105-107 and/or to a set of users and/or user devices 105-107.

To configure and/or provision devices of the example transport network 110, the example network control sub-system 150 of FIG. 2 includes any type of element management system(s) 240. Using any method(s) and/or protocol(s), the example EMS 240 of FIG. 2 configures and/or provisions the example routers 130-135, 140-142 with the necessary parameters to implement the label switched paths selected and/or determined by the example path manager 225.

To detect events, the example EMS 240 of FIG. 2 includes an event detector 245. The example event detector 245 of FIG. 2 monitors the condition(s) and/or performance of the transport network 110 to determine when the transport network 110 may require a different set of label switched paths. The example event detector 245 may also receive event indications from the OSS/NMS server(s) 235 notifying the event detector 245 of a maintenance event and/or device failure. The example event detector 245 of FIG. 2 notifies the path manager 225 of detected events.

It will be readily appreciated by persons of ordinary skill in the art that the example authentication server 205, the example policy management system 210, the example policy manager 220, the example path manager 225, the example OSS/NMS server(s) 235, the example EMS 240 and/or the example event detector 245 of FIG. 2 are logical entities of the example network control sub-system 150 of FIG. 2. For example, any or all of them may be implemented as machine accessible instructions (e.g., software modules) executed by one or more computing devices, servers and/or computing platforms. For instance, a server may be used to implement a first module that implements the example policy manager 220 and a second module that implements the path manager 225. Further, while an example network control sub-system 150 has been illustrated in FIG. 2, the example elements of the network control sub-system 150 may be combined, split, re-arranged, eliminated and/or implemented in any of a variety of ways. Further still, the example authentication server 205, the example policy management system 210, the example policy manager 220, the example path manager 225, the example OSS/NMS server(s) 235, the example EMS 240 and/or the example event detector 245 may be implemented by hardware, software, firmware and/or any combination(s) of hardware, software and/or firmware. Moreover, a network control sub-system 150 may include additional logical entities and/or may include more than one of any of the logical entities illustrated in FIG. 2.

Figure 3:
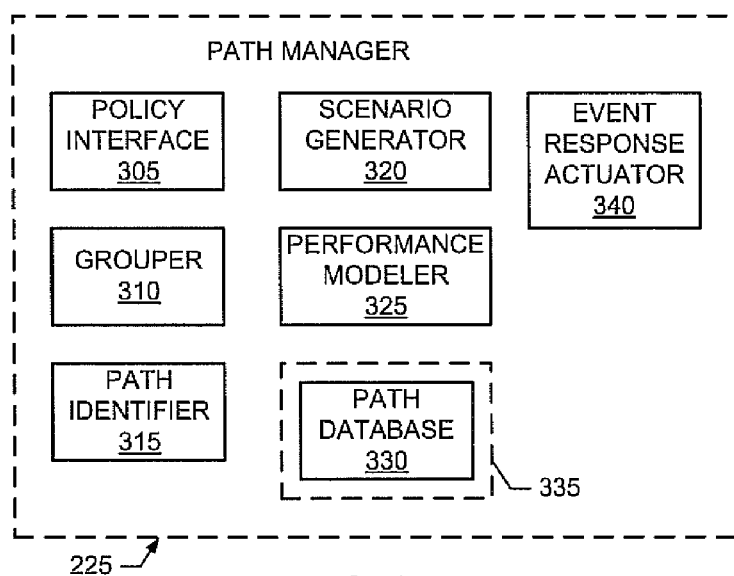
FIG. 3 illustrates an example manner of implementing the example path manager of FIG. 2.

FIG. 3 illustrates an example manner of implementing the example path manager 225 of FIG. 2. To obtain policy information and/or parameters, the example path manager 225 of FIG. 3 includes a policy interface 305. The example policy interface 305 of FIG. 3 can query the policy server policies 215 to obtain policies and/or policy parameters for currently authenticated users and/or user devices 105-107, and/or may receive information concerning policies and/or policy parameters for currently authentication users and/or user devices 105-107 from the example policy manager 220 of FIG. 2.

To group users and/or user devices 105-107, the example path manager 225 of FIG. 3 includes a grouper 310. The example grouper 310 of FIG. 3 identifies sets and/or sub-sets of users and/or user devices 105-107 that share some communication network resources (e.g., a common edge router 130-135, a common communication service providing server and/or network 115-117, a common geographic location, etc.). In the example of FIG. 3, the identified sets and/or subsets will be used when selecting and/or determining label switched paths.

To identify possible paths between users and/or user devices 105-107 and communication service providing servers and/or networks 115-117, the example path manager 225 of FIG. 3 includes a path identifier 315. The example path identifier 315 identifies one or more possible label switched paths through the transport network 110. For example, the path identifier 315 identifies K possible paths having the shortest path lengths, where K is an integer. An example algorithm for identify the K shortest paths is described in an article entitled "Finding the K Shortest Loopless Paths in a Network," authored by J. Y. Yen, and published in July 1971 in Management Science, pp. 712-716. The content of this article is hereby incorporated by reference in its entirety.

To identify network operation scenarios, the example path manager 225 of FIG. 3 includes a scenario generator 320. Using any algorithm(s) and/or method(s), the example scenario generator 320 of FIG. 3 identifies one or more network operation scenarios based upon, for example, various combinations of policy server policies 215 that are in effect, network failure events, time-of-day changes, day-of-week changes, day-of-year changes, usage limits per period, localization prioritization(s), number of label switched paths per router 130-135, 140-142, router load, how many label switched paths can share a communication link, maintenance event(s), and/or prioritization of the same. The network operation scenarios generated by the scenario generator 320 represent a set of possible conditions for which different sets of label switched paths may be required. For example, a scenario may be generated that represents the nominal operation state of the transport network 110, the failure of a particular communication link and/or core router 140-142, heavy loading of a communication path along a commuter route during rush hour, a maintenance event that requires a communication device be taken out of service, etc.

To model the performance of candidate paths (e.g., generated by the example path identifier 315) for a particular scenario (e.g., generated by the example scenario generator 320), the example path manager 225 of FIG. 3 includes a performance modeler 325. The example performance modeler 325 of FIG. 3 models the performance and/or the ability a particular candidate label switched path to satisfy the policy server policy(-ies) 215 currently in effect for authenticated users and/or user devices 105-107 that could be assigned to the label switched path for the particular scenario being considered. For example, the performance modeler 325 can compare the remaining throughput of a label switched path against the data that is guaranteed to a particular user and/or user device 105-107. The example performance modeler 325 of FIG. 3 selects and/or finds the set of label switched paths that satisfies the policy server policies 215 in effect for all currently authenticated users and/or user devices 105-107. Example methods for identifying sets of label switched paths that satisfy a set of constraints (e.g., satisfy the policy server policies 215) are described in U.S. patent application Ser. No. 11/427,135, entitled "Method and Apparatus For Improving Network Performance in a Communication System," and filed on Jun. 28, 2006; and U.S. patent application Ser. No. 11/427,142, entitled "Method and Apparatus for Maintaining Network Performance in a Communication System," and filed on Jun. 28, 2006. U.S. patent application Ser. No. 11/427,135 and U.S. patent application Ser. No. 11/427,142 are each hereby incorporated by reference in their entirety.

For each scenario identified and/or generated by the example scenario generator 320, the example performance modeler 325 stores the identified set of label switched paths that represents the best solution and/or best configuration of the transport network 110 for the scenario in a path database 330. The example path database 330 of FIG. 3 represents multiple sets of label switched paths for respective transport network scenarios. When a transport network scenario occurs that matches an already modeled scenario, the set of label switched paths can be retrieved from the path database 330. The path database 330 may be implemented using any data structure(s), such as the example data structure described below in connection with FIG. 4. The example path database 330 is stored in any number and/or type(s) of data storage device(s) and/or memory(-ies) 335.

To respond to and/or handle detected events, the example path manager 225 of FIG. 3 includes an event response actuator 340. The example event response actuator 340 of FIG. 3 receives and responds to event notifications from the event detector 245 (FIG. 2). The example event response actuator 340 of FIG. 3 compares the network event with the set of scenarios represented in the path database 330. If a matching scenario exists in the path database 330, the transport network 110 can be re-configured with the corresponding label switched paths by, for example, the EMS 240 (FIG. 2). If a matching scenario does not exist, the example event response actuator 340 specifies the scenario to the performance modeler 325. The performance modeler 325 finds and/or solves for a set of label switched paths for the new network event based upon the policy server policies 215. When a new set of label switched paths is identified, the EMS 240 configures and/or provisions the transport network 110 with the new set of label switched paths. The performance modeler 325 also stores the new set of label switched paths and network scenario in the path database 330 for future utilization.

While an example path manager 225 is illustrated in FIG. 3, the example path manager 225 may be implemented using any number and/or type(s) of other and/or additional logic, processors, devices, components, circuits, modules, interfaces, etc. Further, the logic, processors, devices, components, circuits, modules, elements, interfaces, etc. illustrated in FIG. 3 may be combined, divided, re-arranged, eliminated and/or implemented in any of a variety of ways. Additionally, the example path manager 225 may be implemented as any combination(s) of firmware, software, logic and/or hardware. For example, the example policy interface 305, the example grouper 310, the example path identifier 315, the example scenario generator 320, the example performance modeler 325, the example event response actuator 340 and/or, more generally, the example path manager 225 of FIG. 3 may be implemented as coded instructions (e.g., the example coded instructions 610 and/or 612 of FIG. 6) executed by, for example, the example processor 605 of FIG. 6. Moreover, the example path manager 225 may include additional logic, processors, devices, components, circuits, interfaces and/or modules than those illustrated in FIG. 3 and/or may include more than one of any or all of the illustrated processors, devices, components, circuits, interfaces and/or modules.

Figure 4:
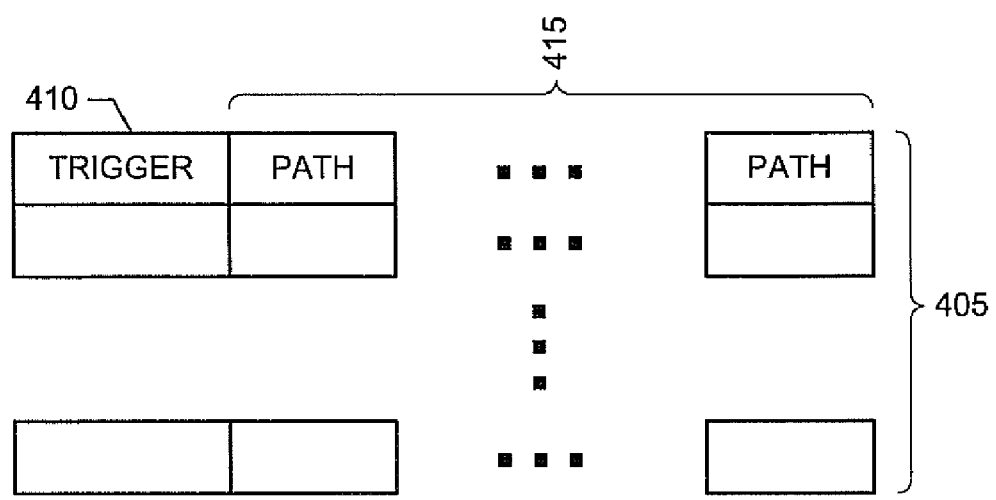
FIG. 4 illustrates an example data structure that may be used to implement the example path database of FIG. 3.

FIG. 4 illustrates an example data structure that may be used to implement the example path database 330 of FIG. 3. The example data structure of FIG. 4 contains a plurality of entries 405 for respective ones of a plurality of network scenarios. To identify a network scenario, each of the entries 405 of FIG. 4 includes trigger field 410. The example trigger field 410 of FIG. 4 contains one or more values and/or alphanumeric strings that uniquely identify a particular network event and/or network operation state. For example, network events may be assigned a unique numeric code (e.g., 100089 indicates core router 140 failed) such that trigger field 410 contains a single numeric value.

To specify a set of label switched paths for the network scenario, each of the example entries 405 of FIG. 4 includes one or more path fields 415. Each of the example path fields 415 contain one or more values and/or alphanumeric strings that represent one or more configuration values and/or parameters necessary to configure one or more of the routers 130-135, 140-142 to implement a particular label switched path. The contents of the path fields 415 may be used by, for example, the EMS 240 of FIG. 2 to configure and/or provision the transport network 110 with the set of label switched paths for the corresponding network event and/or network operation state.

While an example data structure is illustrated in FIG. 4, the example data structure may be implemented using any number and/or type(s) of other and/or additional fields and/or data. Further, the fields and/or data illustrated in FIG. 4 may be combined, divided, re-arranged, eliminated and/or implemented in any of a variety of ways. Moreover, the example data structure may include additional fields and/or data than those illustrated in FIG. 4 and/or may include more than one of any or all of the illustrated fields and/or data. For example, additional fields may be included for each of the path fields 415. Such additional fields could contain a value that represents a user and/or user device 105-107 corresponding to the associated path field 415.

Figure 5A:
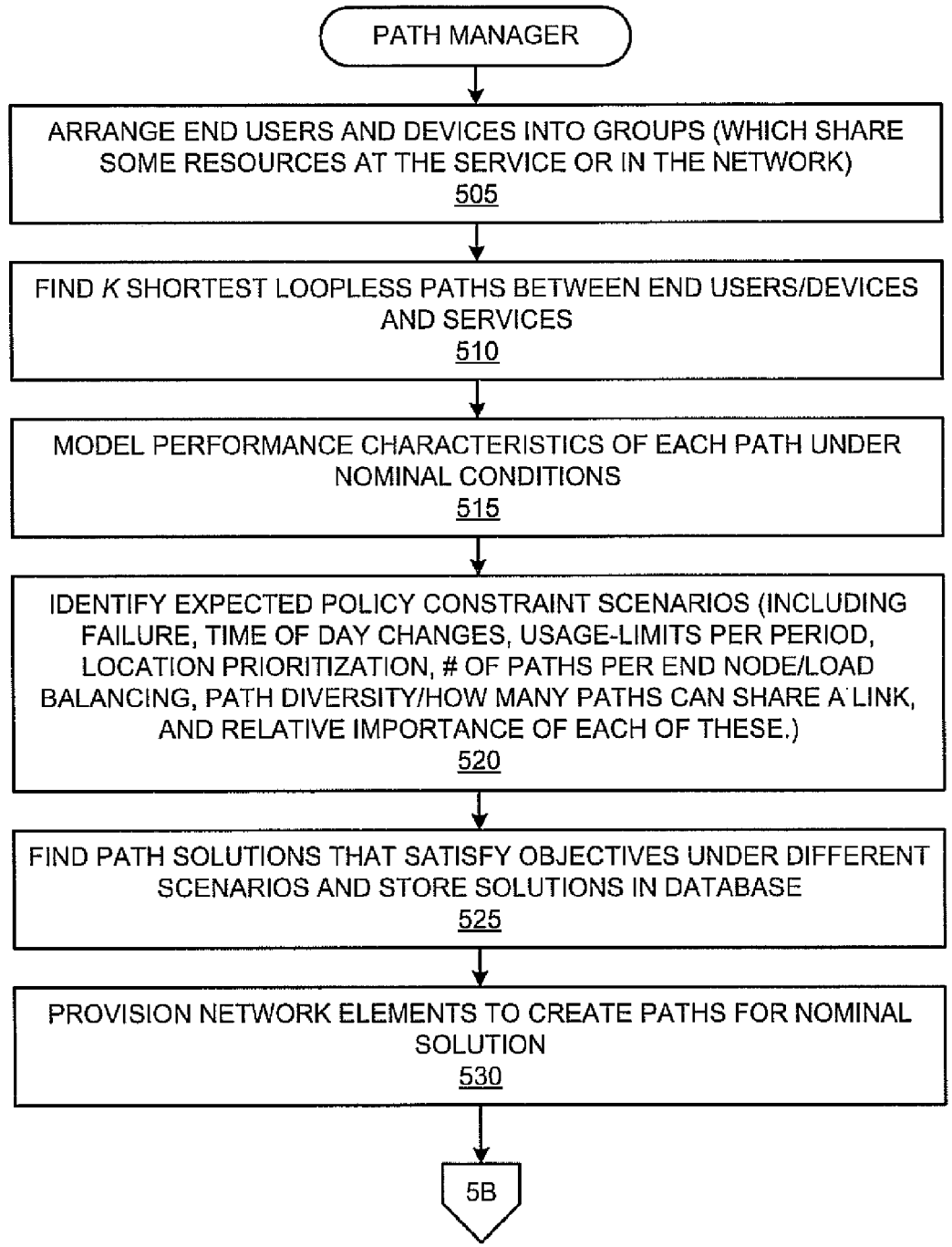
FIGS. 5A and 5B represent an example process that may be carried out to implement any of the example path managers of FIGS. 2 and 3.
Figure 5B:
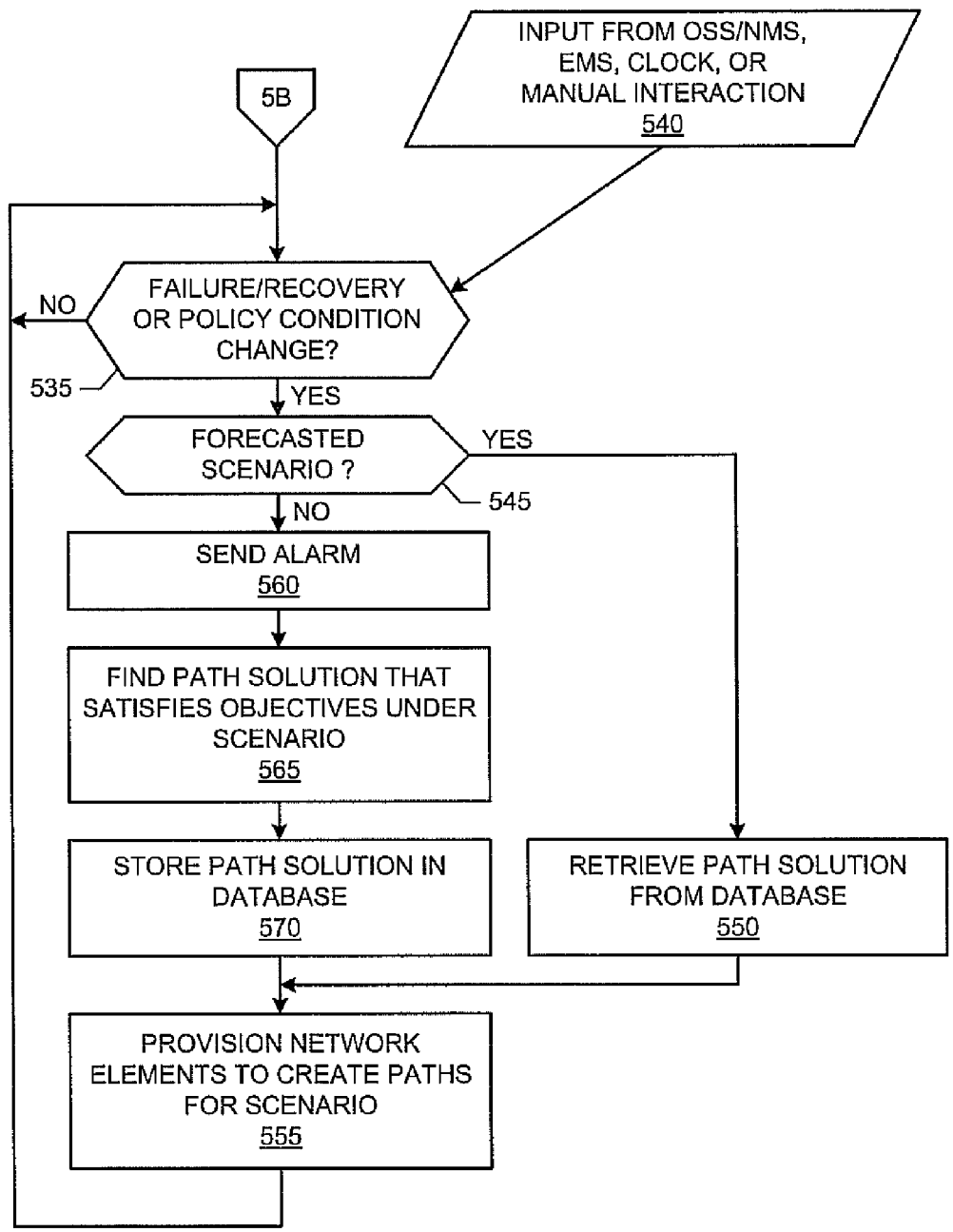

FIGS. 5A and 5B are flowcharts representative of an example process that may be carried out to implement any of the example path managers 225 of FIGS. 2 and 3. The example process of FIGS. 5A and 5B may be carried out by a processor, a controller and/or any other suitable processing device. For example, the example process of FIG. 5A and 5B may be embodied in coded instructions stored on a tangible medium such as a flash memory, a read-only memory (ROM) and/or random-access memory (RAM) associated with a processor (e.g., the example processor 605 discussed below in connection with FIG. 6). Alternatively, some or all of the example process of FIGS. 5A and 5B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example process of FIGS. 5A and 5B may be implemented manually or as any combination(s) of any of the foregoing techniques, for example, any combination of firmware, software, discrete logic and/or hardware. Further, although the example process of FIGS. 5A and 5B is described with reference to the flowcharts of FIGS. 5A and 5B, persons of ordinary skill in the art will readily appreciate that many other methods of implementing any of the example path managers 225 of FIGS. 2 and 3 may be employed. For example, the order of execution of the blocks may be changed, and/or some of the blocks described may be changed, eliminated, sub-divided, or combined. Additionally, persons of ordinary skill in the art will appreciate any or all of that the example process of FIGS. 5A and 5B may be carried out sequentially and/or carried out in parallel by, for example, separate processing threads, processors, devices, discrete logic, circuits, etc.

The example process of FIG. 5A begins with a path manager (e.g., the example path manager 225 and/or, more specifically, the example group 310 of FIGS. 2 and 3) arranging users and/or user devices (e.g., the example user devices 105-107 of FIG. 1) into groups that share some communication network resources (e.g., a common edge router 130-135 and/or a communication service providing server and/or network 115-117) (block 505). The path manager (e.g., the example path identifier 315) identifies the K shortest loopless paths (block 510).

The path manager (e.g., the example performance modeler 325 of FIG. 3) models the performance of each of the identified paths under nominal network conditions (block 515). A scenario generator (e.g., the example scenario generator 320) identifies one or more network operation scenarios (block 520). The performance modeler 325 models and/or computes the performance of the candidate paths for each scenario and stores an identified set of label switched paths for each scenario in a path database (e.g., the example path database 330) (block 525). An EMS (e.g., the example EMS 240 of FIG. 2) configures and/or provisions a transport network (e.g., the example transport network 110) with the set of label switched paths for the nominal network operation scenario (block 530). Control continues at block 535 of FIG. 5B.

An EMS (e.g., the example EMS 240 of FIG. 2 and/or, more particularly, the example event detector 245) monitors the operation of the transport network and/or monitors inputs 540 from an OSS/NMS (e.g., the example OSS/NMS server(s) 235 of FIG. 2), a real-time clock and/or a technician/operator. When a network event is detected (block 535), an event response actuator (e.g., the example event response actuator 340 of FIG. 3) determines if the network event corresponds to an already modeled network scenario (block 545).

If the network event corresponds to an already modeled network scenario (block 545), the event response actuator retrieves the label switched path solution from the path database (block 550). The EMS configures and/or provisions the transport network with the retrieved label switched path solution (block 555). Control then returns to block 535 to wait for another network event to occur.

If the network event does not correspond to an already modeled network scenario (block 545), the event response actuator sends an alarm to, for example, an OSS/NMS server (block 560). The performance modeler determines a set of label switched paths for the new network scenario (block 565) and stores the label switched path solution in the path database (block 570). Control proceeds to block 555 to configure and/or provision the transport network with the identified path solution.

Figure 6:
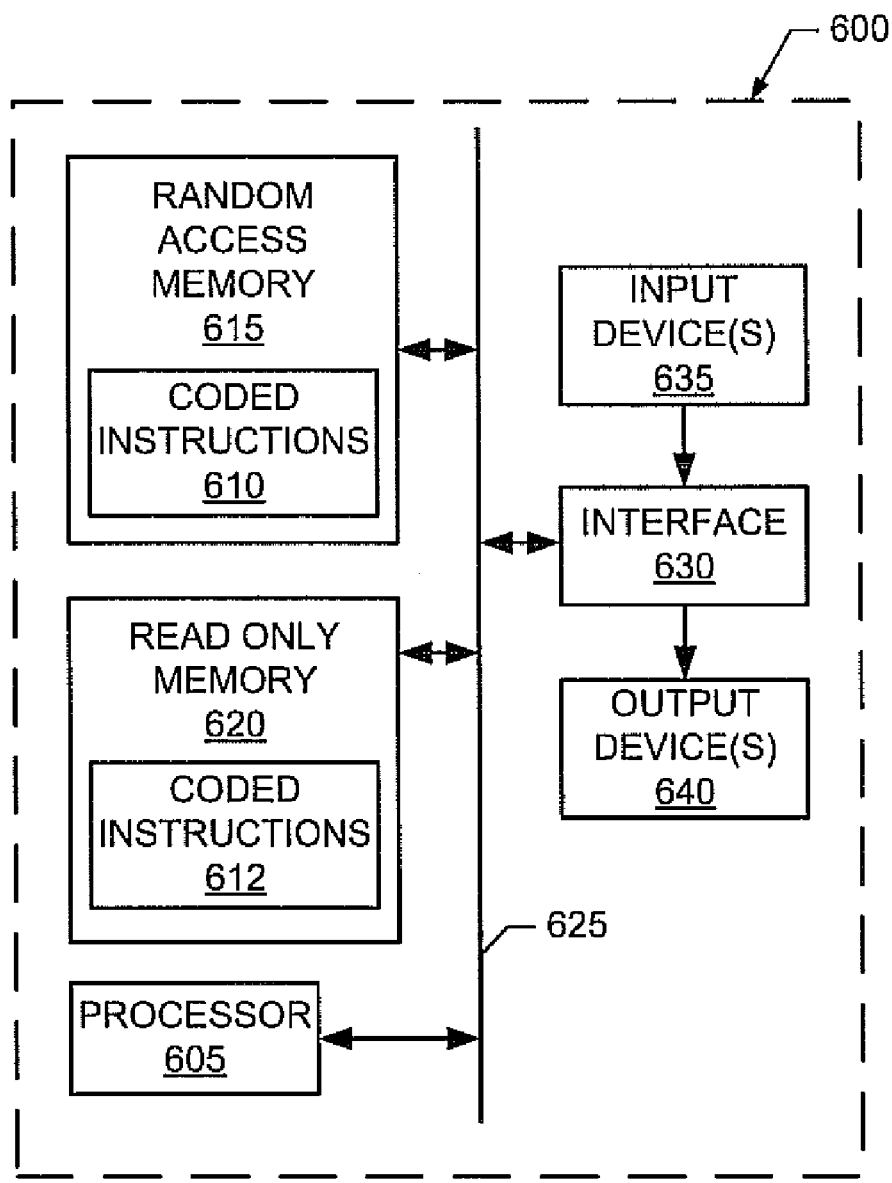
FIG. 6 is a schematic illustration of an example processor platform that may be used and/or programmed to execute the example process of FIGS. 5A and 5B to implement the example path managers described herein.

FIG. 6 is a schematic diagram of an example processor platform 600 that may be used and/or programmed to implement the example network control sub-system 150, the example policy management system 210, the example policy manager 220 and/or the example path manager 225 of FIGS. 1, 2 and 3. For example, the processor platform 600 can be implemented by one or more general purpose processors, processor cores, microcontrollers, etc.

The processor platform 600 of the example of FIG. 6 includes at least one general purpose programmable processor 605. The processor 605 executes coded instructions 610 and/or 612 present in main memory of the processor 605 (e.g., within a RAM 615 and/or a ROM 620). The processor 605 may be any type of processing unit, such as a processor core, a processor and/or a microcontroller. The processor 605 may execute, among other things, the example process of FIGS. 5A and 5B to implement the example path manager 225 of FIGS. 2 and 3. The processor 605 is in communication with the main memory (including a ROM 620 and/or the RAM 615) via a bus 625. The RAM 615 may be implemented by DRAM, SDRAM, and/or any other type of RAM device, and ROM may be implemented by flash memory and/or any other desired type of memory device. Access to the memory 615 and 620 maybe controlled by a memory controller (not shown). The RAM 615 may be used to store and/or implement, for example, the example path database 330 of FIGS. 3 and 4.

The processor platform 600 also includes an interface circuit 630. The interface circuit 630 may be implemented by any type of interface standard, such as an external memory interface, serial port, general purpose input/output, etc. One or more input devices 635 and one or more output devices 640 are connected to the interface circuit 630. The input devices 635 and/or output devices 640 may be used to, for example, implement interfaces between the example path manager 225 and/or the example event detector 245 and the example transport network 110 of FIGS. 1, 2 and 3.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories, or successor physical media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
a memory to store a first user policy comprising a first authentication credential and a first policy parameter for a first user device, and a second user policy comprising a second authentication credential and a second policy parameter for a second user device, wherein the first policy parameter and the second policy parameter each comprises at least one of a quality of service (QoS) parameter, a bandwidth parameter, or a service parameter for the first user device or the second user device respectively;
a policy manager to provide the first and second policies to an authentication server to authenticate the first and second user devices to a communication network;
a path identifier to identify a plurality of candidate end-to-end communication paths through the communication network between the first and second user devices, wherein the path identifier is to identify the plurality of communication paths for a first network scenario, and to identify a second plurality of candidate end-to-end communication paths through the communication network between the first and second user devices for a second network scenario;
a performance modeler to develop a plurality of values for respective ones of the plurality of communication paths, wherein each value represents at least one of a performance or an ability of the respective communication path to satisfy the first and second policy parameters, and wherein two or more of the plurality of values indicate that the respective communication path satisfies the first and second policy parameters, wherein the performance modeler is to develop the plurality of values for the first network scenario, and to develop a second plurality of values for respective ones of the second plurality of communication paths, wherein each of the second plurality of values represents how the respective communication path satisfies the first and second policy parameters; and a path manager to select a one of the plurality of communication paths based on the plurality of values, and to configure the communication network to transport data between the first and second user devices on the selected one of the plurality of communication paths~wherein the policy manager is to select the one of the plurality of communication paths for the first network scenario, to select a one of the second plurality of communication paths for the second network scenario based on the second plurality of values, and to select between the selected one of the plurality of the plurality of communication paths and the selected one of the second plurality of communication paths based on a comparison of a current state of the network and the first and second network scenarios.

2. An apparatus as defined in claim 1, wherein each of the plurality of communication paths comprises a label switched path.

3. An apparatus as defined in claim 1, wherein the path manager is to configure at least one of an edge router or a core router of the communication network to implement the selected one of the plurality of communication paths.

4. An apparatus as defined in claim 1, wherein the path identifier is to identify the plurality of communication paths based on a defined network scenario.

5. An apparatus as defined in claim 1, wherein the performance modeler is to develop the plurality of values based upon at least one of a time-of-day, a day-of-week, a day-of-year, a usage limit per period, a localization priority, a maintenance event, or a network fault.

6. An apparatus as defined in claim 1, wherein the selected one of the plurality of communication paths includes one or more core elements of the communication network.

7. An apparatus as defined in claim 1, wherein the value represents a difference between an available throughput of the respective communication path and the first policy parameter.

8. An apparatus as defined in claim 1, wherein the plurality of communication paths are shortest loopless paths between the first and second user devices through the communication network.

9. An apparatus as defined in claim 1, wherein the memory comprises:
a first memory device to store the first user policy; and
a second memory device to store the second user policy.

10. A method comprising:
providing first and second policies to an authentication server to authenticate respective first and second user devices to a communication network, the first policy comprising a first authentication credential and a first policy parameter for a first endpoint associating with the first user device, and the second policy comprising a second authentication credential and a second policy parameter for a second endpoint associating with the second user device, wherein the first policy parameter and the second policy parameter each comprises at least one of a quality of service (QoS) parameter, a bandwidth parameter, or a service parameter for the first user device or the second user device respectively;
identifying a plurality of candidate end-to-end communication paths through the communication network between the first and second endpoints, wherein the plurality of communication paths are identified for a first network scenario;
modeling the communication network to develop a plurality of values for respective ones of the plurality of communication paths, wherein each value represents at least one of a performance or an ability of hew the respective communication path to satisfy the first and second policy parameters, and wherein two or more of the plurality of values indicate that the respective communication path satisfies the first and second policy parameters, wherein the plurality of values are developed for the first network scenario, and wherein the one of the plurality of communication paths is selected for the first network scenario;
selecting one of the plurality of communication paths based on the plurality of values;
provisioning one or more elements of the communication network to implement the selected one of the plurality of communication paths;
identifying a second plurality of candidate end-to-end communication paths through the communication network between the first and second user devices for a second network scenario;
modeling the communication network to develop a second plurality of values for respective ones of the second plurality of communication paths, wherein each of the second plurality of values represents how the respective communication path satisfies the first and second policy parameters;
selecting a one of the second plurality of communication paths for the second network scenario based on the second plurality of values; and
selecting between the selected one of the plurality of the plurality of communication paths and the selected one of the second plurality of communication paths based on a comparison of a current state of the network and the first and second network scenarios.

11. A method as defined in claim 10, further comprising provisioning the selected one of the plurality of communication paths as a label switched path.

12. A method as defined in claim 10, wherein the plurality of values are developed based upon at least one of a time-of-day, a day-of-week, a day-of-year, a usage limit per period, a localization priority, a maintenance event, or a network fault.

13. A method as defined in claim 10, wherein the first network scenario comprises at least one of a time-of-day, a day-of-week, a day-of-year, a usage limit per period, a localization priority, a maintenance event, or a network fault.

14. A tangible computer readable medium excluding propagating signals and storing machine readable instructions which, when executed, cause a machine to:
provide first and second policies to an authentication server to authenticate respective first and second user devices to a communication network, the first policy comprising a first authentication credential and a first policy parameter for a first endpoint associating with the first user device, and the second policy comprising a second authentication credential and a second policy parameter for a second endpoint associating with the second user device, wherein the first policy parameter and the second policy parameter each comprises at least one of a quality of service (QoS) parameter, a bandwidth parameter, or a service parameter for the first user device or the second user device respectively;
identify a plurality of candidate end-to-end communication paths through the communication network between the first and second endpoints, wherein the plurality of communication paths are identified for a first network scenario;

model the communication network to develop a plurality of values for respective ones of the plurality of communication paths, wherein each value represents at least one of a performance or an ability of the respective communication path to satisfy the first and second policy parameters, and wherein two or more of the plurality of values indicate that the respective communication path satisfies the first and second policy parameters, wherein the plurality of values are developed for the first network scenario, and wherein the one of the plurality of communication paths is selected for the first network scenario;

select one of the plurality of communication paths based on the plurality of values;

configure one or more elements of the communication network to implement the selected one of the plurality of communication paths;

identify a second plurality of candidate end-to-end communication paths through the communication network between the first and second user devices for a second network scenario;

model the communication network to develop a second plurality of values for respective ones of the second plurality of communication paths, wherein each of the second plurality of values represents how the respective communication path satisfies the first and second policy parameters;

select one of the second plurality of communication paths for the second network scenario based on the second plurality of values; and select between the selected one of the plurality of the plurality of communication paths and the selected one of the second plurality of communication paths based on a comparison of a current state of the network and the first and second network scenarios.

15. A tangible computer readable medium as defined in claim 14, wherein the machine readable instructions, when executed, cause the machine to configure the selected one of the plurality of communication paths as a label switched path.

16. A tangible computer readable medium as defined in claim 14, wherein the first network scenario comprises at least one of a time-of-day, a day-of-week, a day-of-year, a usage limit per period, a localization priority, a maintenance event, or a network fault.

* * * * *